W. R. KELSEY.
Bee Hive.
No. 4,501. Patented May 9, 1846.
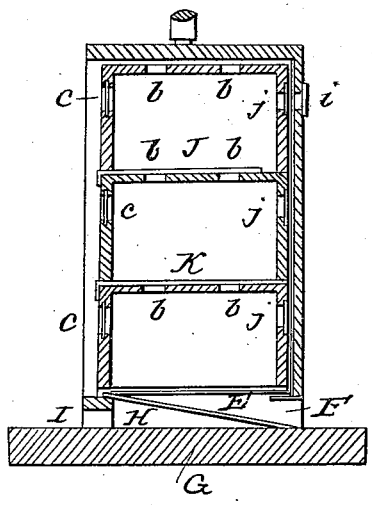
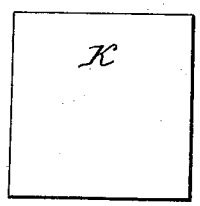
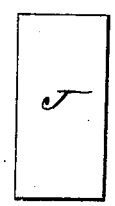
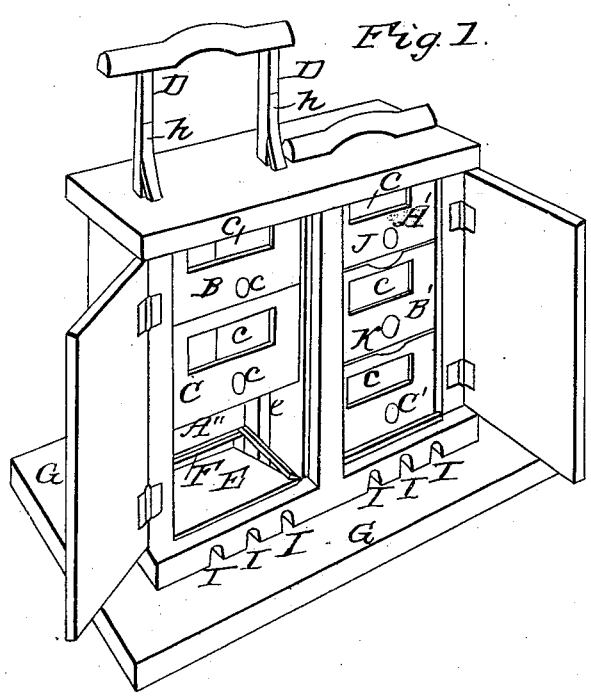
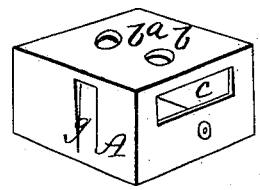
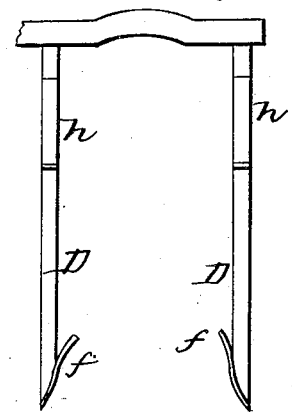

UNITED STATES PATENT OFFICE.

WM. R. KELSEY, OF STARKEY, NEW YORK.

BEEHIVE.

Specification of Letters Patent No. 4,501, dated May 9, 1846.

*To all whom it may concern:*

Be it known that I, WILLIAM R. KELSEY, of the town of Starkey, in the county of Yates, in the State of New York, have made a new and useful Improvement in the Manner of Constructing Hives for Bees; and I do hereby declare that the following is a full and exact description thereof.

One main object of my improvement is to prevent the hatching of the eggs of the miller, or bee-moth, and thereby to protect the bees against that formidable enemy, the ravages of which have put a stop to the attempt to keep bees in most parts of our country. Numerous attempts have been made to effect this, but neither of them has been attended with success; I am well assured however from long continued experiments that the mode herein described will be found effectual.

Another intention of my improvement is to arrange the respective parts of my hive in such manner as that the honey which is taken therefrom shall always be such as has been newly made and to leave the bees undisturbed in the compartment in which they are working; and also to enable me to form a new swarm from the young brood that has been left in a filled hive.

In the accompanying drawing Figure 1 is a perspective representation of a series of boxes or hives, showing two tiers, each tier containing three boxes or hives A, B, C, and A', B', C'; one of which, A, is removed and shown separately in Fig. 2. These boxes slide in and out of their respective cases, in the manner of drawers, so that they may be removed and replaced when desired. They are entirely open at their lower sides, but have a cover *a a* at their upper, which is perforated with two or more holes *b b* to allow the bees to pass from one hive or box to the other; *c* is a glass in front, through which to observe the interior.

In Fig. 1, there is a space A'' unoccupied by a box, the box A, which I will suppose to have constituted the uppermost of the tier A, B, C, being, as above stated, removed, and the two, B and C, having been subsequently raised so as to leave the vacant space A'', at the bottom. This removal of the upper, and the raising of the two lower boxes is an important feature of my arrangement. D D are two lifting rods, with which each tier is to be provided; these slide up and down in grooves made in the sides of the case containing the boxes; a part of one of these grooves is seen at *e* Fig. 1.

Fig. 3 is a separate view of a pair of these lifting rods which have spring catches *f* at their lower ends, that catch in recesses *g* Fig. 2 in the center box, and raise it and the one above it into the position shown at B, C. *h* are two spring catches that serve to hold the boxes B, C, in place until a fresh one is made to occupy the space A''.

E Fig. 1 is an inclined plane formed of a sheet of zinc or other metal up which the bees ascend to the lower box or hive from the back part of the structure; this plate rests at the back on the stand, or platform which supports the hive, which platform is to be of stone, or of wood covered with sheet metal, for a reason to be presently given.

Fig. 4 is a vertical section from front to back through the middle of one of the series of boxes. F is the place of entrance for the bees, up the inclined metallic plate E. The case containing the boxes, or hives, is shown as resting on the support or platform G, which, as above indicated, is to consist of a flat stone, or of plank covered with plates of zinc, or other metal. Between this platform and the inclined plate E there is an inclosed space H, the only entrance into which, is through openings seen at I, I, Fig. 1. Through these opening the bee-moth will enter and deposit its eggs, and in this situation I have fully ascertained that they will not hatch and produce worms, a result apparently consequent on the moisture retained within this space, which is entirely inclosed by metal, or by metal and stone, where the germs invariably perish; it appearing that wood or other vegetable matter is necessary to their vitality. On the back of the case, behind each series of boxes, there is a vertical groove made for ventilation, and this is covered at its upper end by a perforated plate of metal *i i;* the perforations being made small to prevent the entrance of insects, and at the back of each box there is a similar ventilating plate *j, j*.

This apparatus may be varied in size but I have made the boxes A, B, C, each eight inches high and thirteen inches in width and depth, and find this size most convenient. When the bees begin to work in such an apparatus they will with almost unerring certainty ascend to the upper part, and first build their hives in the box at top; when this is filled they will of course descend into the middle box and thence to the lower. When they have made considerable progress in the latter, the queen and the general inhabitants of the hive will have left the upper box, which will then contain but few, excepting the germs or young, in the breeding comb. The box so filled, say A, is then to be removed so as to constitute the uppermost of a second tier, and in order to do this two plates of tin or other metal are to be provided such as are shown at J and K Figs. 5 and 6. The plate J is to be slipped in over the openings b b in the upper box, and that marked K, which is identical with that forming the inclined plane E, is slid in between the boxes A and B, the plate being of such size as to adapt it to that use. This plate should be perforated with a number of small holes for ventilation. The bees will consequently be confined in the box A, which may be then removed and slid into the place of that marked A' in the second tier, which tier may be supposed to consist of empty hives. The boxes B and C are then to be elevated by means of the lifting rods D D as represented and the empty box A' inserted under them. The full boxes so removed in the early part of the season, that is, during the breeding period, will form a new family, the germs being hatched therein and the young bees being fed by attendant bees, as though they had not been removed. The hives filled elevated, and removed in the more advanced part of the season, that is, after the time of breeding, will be free or nearly so from inhabitants. Under this arrangement of the hives new honey will always be obtained from the successive boxes, while those in which the bees breed and feed will also consist of new honey.

It has been found most expedient to bury the hives in trenches and to cover them with straw, or other like material, during the winter, but the hives as ordinarily constructed have been found to be then subjected to the ravages of mice, but when constructed on my plan they are secured from this enemy. The plate of metal E that forms the inclined plane, or one exactly like it is slipped in under the lower box, so as to close it, and thus fortified, the mice are excluded. The lives and health of the bees are protected by this treatment; and there is found to be much economy in the consumption of honey.

Having thus fully described the manner in which I construct, arrange and use my combined tiers of hives, what I claim as new therein, and desire to secure by Letters Patent, is—

1. The manner of arranging the respective tiers of boxes so that the upper one of each tier may be removed and the two lowermost may be elevated and held in place by means of the sliding rods, for the purpose of introducing an empty hive beneath them in the manner, and for the purpose set forth. I do not claim the arranging of the boxes in tiers one above the other, and the forming of passages between these boxes, but limit my claim to the particular combination of parts by which this combination is rendered effective in attaining the proposed end in the manner described.

2. I likewise claim the forming of a compartment below the hives surrounded entirely by stone or metal, and so arranged, as described, as to induce the bee-moth to deposit its eggs in such compartment where they necessarily perish, and the bees are consequently protected from this formidable enemy.

WM. R. KELSEY.

Witnesses:
 THOS. P. JONES,
 EDWIN L. BRUNDAGE.